(No Model.)
W. H. WHITING.
SIFTER FOR ASHES, &c.
No. 574,696. Patented Jan. 5, 1897.
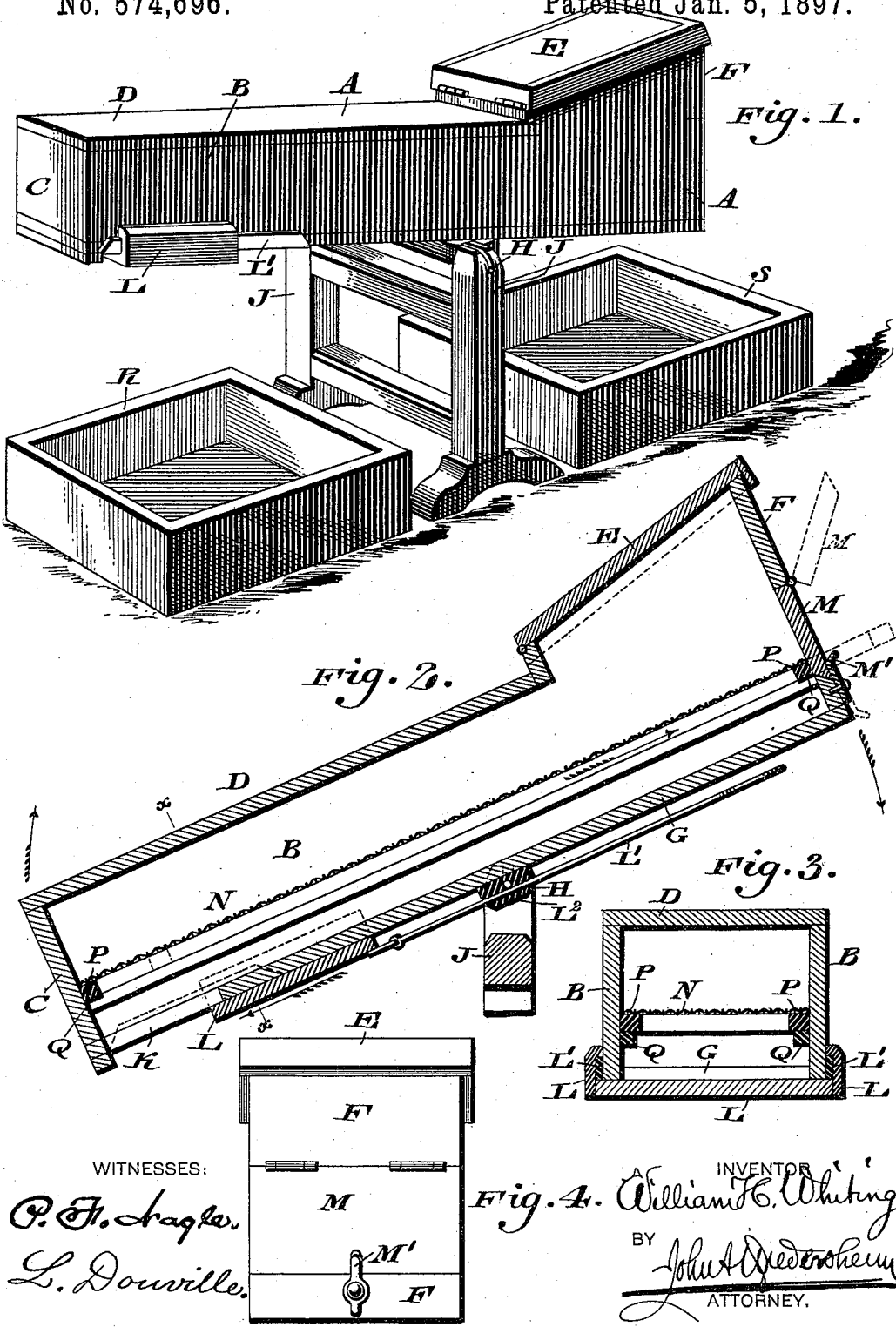
WITNESSES:
INVENTOR
William H. Whiting,
BY
John A. Wiedersheim,
ATTORNEY.

UNITED STATES PATENT OFFICE.

WILLIAM H. WHITING, OF PHILADELPHIA, PENNSYLVANIA.

SIFTER FOR ASHES, &c.

SPECIFICATION forming part of Letters Patent No. 574,696, dated January 5, 1897.

Application filed November 29, 1895. Serial No. 570,357. (No model.)

*To all whom it may concern:*

Be it known that I, WILLIAM H. WHITING, a subject of the Queen of Great Britain, having resided one year last past in the United States and declared my intention of becoming a citizen thereof, residing in the city and county of Philadelphia, State of Pennsylvania, have invented a new and useful Improvement in Sifters for Ashes and other Materials, which improvement is fully set forth in the following specification and accompanying drawings.

My invention consists of a sifter for ashes and other material, the same being composed of an oscillating box, a sieve therein, and means for discharging the sifted or solid materials at different parts of said box, said box having a valve whose handle is guided in a cross-piece of the journals of the box.

Figure 1 represents a perspective view of a sifter embodying my invention. Fig. 2 represents a longitudinal section thereof. Fig. 3 represents a transverse section on line $x\ x$, Fig. 2. Fig. 4 represents an end view thereof.

Similar letters of reference indicate corresponding parts in the several figures.

Referring to the drawings, A designates a box of quadrilateral or other suitable shape, and may be of galvanized iron, wood, or other material, and formed of the sides B, end C, the hopper F, bottom G, and top D, said hopper being provided with the door E, whereby the box may be supplied with the material to be sifted. Connected with the box are journals H, which are mounted upon the stand J, whereby the box may be rocked or oscillated in the longitudinal direction of the same. In the under side of the bottom, at one end thereof, is the discharge-opening K, which is adapted to be closed by the valve or gate L, the latter being mounted on the ways on the sides of the box and provided with the handle L', which is guided in the cross-piece or cleat L² on the box to which the journals of the box are attached.

M designates a door which closes an opening in the portion of the end of the box below the hopper F, the same being retained in a closed position by the catch M'.

Within the box is a grating or sieve whose frame P rests freely upon the ways or supports Q, said screen being so located that when the door M is open the former can be readily withdrawn from the box for purposes of inspection, repairs, &c., it being noticed that one of the openings in the end of the box is above said sieve and the other opening is below the same.

In order to receive the sifting and the sifted material, I employ the receptacles R and S, which, when the work is to be accomplished, are so located that the opposite ends of the box may enter the same, as will be apparent in Fig. 1.

The operation is as follows: The box is supplied with the material to be sifted and it is then rocked or oscillated to the required extent. The box is then caused to assume the tilted position shown in Fig. 2, whereupon the valve L is opened and the siftings will then drop into the receptacle R. The box is now turned in the opposite direction and the door M opened, when the solid material will be discharged into the receptacle S.

Having thus described my invention, what I claim as new, and desire to secure by Letters Patent, is—

A box having a discharge-opening, and a sieve above the same, in combination with a valve which is adapted to close said opening, and a handle which is connected with said valve and guided in a cross-piece of the journals of the box, substantially as described.

WILLIAM H. WHITING.

Witnesses:
JOHN A. WIEDERSHEIM,
WM. C. WIEDERSHEIM.